United States Patent [19]

King

[11] Patent Number: 5,381,834

[45] Date of Patent: Jan. 17, 1995

[54] HOSE ASSEMBLY INCLUDING REINFORCED LAYER HAVING WEAR REDUCING FIBERS

[75] Inventor: Michael G. King, Napoleon, Mich.

[73] Assignee: Teleflex Incorporated, Plymouth Meeting, Pa.

[21] Appl. No.: 120,862

[22] Filed: Sep. 14, 1993

[51] Int. Cl.[6] ............................................. F16L 11/04
[52] U.S. Cl. .................................... 138/125; 138/103;
  138/109; 138/137; 138/174; 138/DIG. 3;
  361/215; 174/47
[58] Field of Search ............... 138/103, 109, 124, 125,
  138/126, 137, DIG. 3, 174, 177, 178; 361/215;
  174/47

[56] References Cited

U.S. PATENT DOCUMENTS

| | | | |
|---|---|---|---|
| Re. 13,568 | 5/1913 | Cobb | 138/124 |
| 1,925,901 | 9/1933 | Leguillon | 138/126 |
| 2,977,839 | 4/1961 | Koch | 138/125 |
| 3,030,253 | 4/1962 | St. John et al. | 138/DIG. 3 |
| 3,060,973 | 10/1962 | Milnar | 138/126 |
| 3,605,818 | 9/1971 | Balchan | 138/126 |
| 4,196,464 | 4/1980 | Russell | 361/215 |
| 4,215,384 | 7/1980 | Elson | 174/47 |
| 4,259,991 | 4/1981 | Kutnyak | 138/125 |
| 4,276,908 | 7/1981 | Horne | 138/125 |
| 4,303,457 | 12/1981 | Johansen et al. | 138/125 |
| 4,308,895 | 1/1982 | Greco | 138/125 |
| 4,394,705 | 7/1983 | Blachmann | 138/125 |
| 4,420,018 | 12/1983 | Brown | 138/124 |
| 4,553,568 | 11/1985 | Piccoli et al. | 138/125 |
| 4,559,782 | 12/1985 | Ritchey et al. | 138/125 |
| 4,675,780 | 6/1987 | Barnes et al. | 361/215 |
| 4,817,613 | 4/1989 | Jaraczewski | 138/125 |
| 4,836,080 | 6/1989 | Kite et al. | 138/125 |
| 4,870,535 | 9/1989 | Matsumoto | 361/125 |
| 4,898,212 | 2/1990 | Searfoss et al. | 138/125 |
| 5,124,878 | 6/1992 | Martucci | 361/215 |
| 5,170,011 | 12/1992 | Martucci | 361/215 |

Primary Examiner—James E. Bryant, III
Attorney, Agent, or Firm—Reising, Ethington, Barnard, Perry & Milton

[57] ABSTRACT

A hose assembly (10) is of the type for carrying high pressure fluids therethrough. The hose assembly (10) includes a tubular member (11) and a pair of coupling members (20). The tubular member (11) includes an inner liner (12) of a fluorocarbon polymer. Yarns (15) fabricated from fibers (17), including glass fibers and aramid fibers (19), are braided together about the exterior of the inner liner (12) to form a braided layer (13). The assembly (10) further includes an outer fluorocarbon coating (14) dispersed throughout the braided layer (13) to prevent kinking or permanent deformation in the inner liner (12), in addition to preventing the crushing of the yarns (15) when the ends are crimped to receive the coupling members (20). A conductive strip (16) is formed on the inner liner (12) for dissipating electrical charges which may accumulate in the inner liner (12).

4 Claims, 2 Drawing Sheets

HOSE ASSEMBLY INCLUDING REINFORCED LAYER HAVING WEAR REDUCING FIBERS

BACKGROUND ART

1. Technical Field

This invention relates to a hose construction. Specifically, the invention relates to a hose assembly adapted for carrying vehicular fluids under high pressures.

2. Description of Related Art

Hose assemblies used to carry brake fluids are well known in the art. The hose should preferably be strong and resilient to heat, chemical degradation, and high pressures. These hoses are subject to chemical breakdown by various fluids which flow through them. Further, these hoses are typically routed through the engine compartment of the vehicle to deliver fluids between the various components of the vehicle. These engines are hot and thus, the hoses used to carry fluids are subject to breakdown from the heat. Further, some of the fluids are under high pressure which adds to the weakening process of the hoses.

TEFLON ® hoses provide the necessary physical properties to carry fluids. A major problem with these types of hoses is that when used alone, i.e., only a TEFLON ® liner or conduit, they tend to get bent during installation and they kink. Further, a TEFLON ® hose used alone cannot withstand fluids under high pressures which are sometimes required.

To solve these problems, one known hose assembly includes an inner TEFLON ® tubular member. The inner tubular member is surrounded by a tightly wound metallic braid. The metallic braid allows the TEFLON ® inner tubular member to bend to a certain degree without kinking. However, if bent past a certain point, the metallic braid aids in the kinking of the inner tubular member. Other disadvantages include, the metallic braid rubbing against itself and wears itself out when high pressure impulses of fluid are sent through the hoses being thermally and electrically conductive and transmitting noise during vibration of the vehicle which is undesirable.

U.S. Pat. No. 5,124,878 to Martucci issued Jun. 23, 1992 and assigned to the assignee of the subject invention discloses a vehicular fuel hose having an inner liner and a reinforcing layer. The reinforcing layer includes yarns of glass fiber braided together and is used to strengthen the inner liner and help prevent kinking or permanent deformation in the inner liner. This fuel hose, however, is incapable of withstanding the high pressures through which other vehicular fluids pass. For example, vehicular brake fluid in anti-lock brake systems (ABS) extend well beyond the range in which the fiberglass can withstand because the tensile strength is inefficient and because the fiberglass braid will wear on itself and exterior surfaces, and weaken the hose to a point where the hose will rupture, an intolerable occurrence.

SUMMARY OF INVENTION AND ADVANTAGES

According to the present invention there is provided a hose assembly consisting of an inner fluorocarbon polymeric tubular liner having two ends and a longitudinal hollow body extending therebetween. An outer reinforcing layer surrounds the inner fluorocarbon polymeric tubular liner wherein the outer reinforcing layers includes a plurality of yarns fabricated from a plurality of fibers tightly braided together and surrounding the inner fluorocarbon polymeric tubular liner. The outer reinforcing layer further includes an organic polymeric material consisting essentially of a fluorocarbon polymer which is resistant to thermal and chemical degradation and is dispersed in the plurality of yarns. The organic polymeric material lubricates and strengthens the plurality of yarns. The hose assembly is characterized by the plurality of yarns including wear reducing means for reducing the wear on the hose assembly from friction produced by each of said plurality of yarns moving against exterior surfaces due to impulses of fluids under high pressure passing therethrough.

By incorporating the wear reducing means in the yarns used to fabricate the outer reinforcing layer, the hose assembly is capable of allowing fluids under high pressure impulses to pass therethrough without self-wearing because the wear reducing means is resilient and can withstand friction created by the back-and-forth motion of the yarns with respect to each other due to the high pressure impulses forcing the movement thereof.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE DRAWINGS

Figure 2:
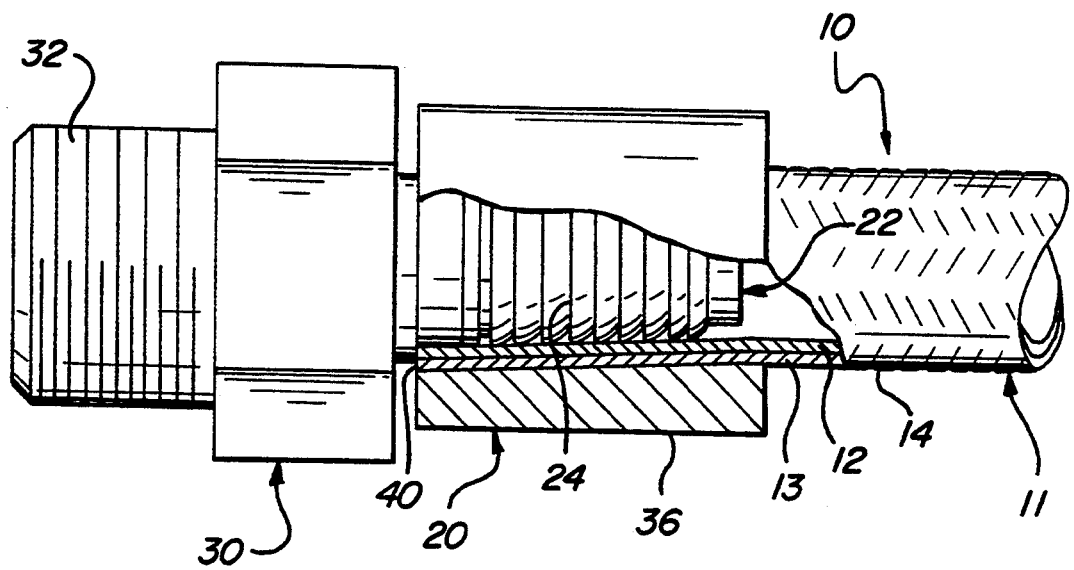
FIG. 2 is a side view partially broken away of the preferred embodiment of the preferred embodiment of the subject invention including a coupling member.

A hose assembly made in accordance with the instant invention is generally shown at 10 in the figures. The assembly 10 includes a tubular member, generally indicated at 11. Couplers, generally indicated at 20 (as best viewed in FIGS. 2 and connect the ends of the tubular member 11 to fittings for conducting fluid therethrough.

The tubular member 11 includes an inner organic polymeric liner 12 having two ends 40 and a hollow body 42 extending therebetween. The liner 12 is preferably extruded and has a wall thickness of between 0.001 and 0.120 inches. The inner liner 12 is preferably made a fluorocarbon polymer. Specifically, the inner liner is made of the polymer of tetrafluoroethylene (PTFE), the polymer of fluorinated ethylene propylene (FEP), a polymer of perfluoroalkoxy resin (PFA), or the polymer of ethylene-tetrafluoroethylene (ETFE). The fluorocarbon polymers PTFE, FET, and PFA are sold under the trademark TEFLON ® by DuPont. The polymer ETFE sold under the trademark TEFZEL ® by DuPont.

The inner liner 12 is impervious to fluid flow through the wall. Since the inner liner 12 is preferably made of a fluorocarbon polymer material, it is resistant to both heat and chemical degradation. This allows a variety of fluids, particularly vehicular fuels and brake fluids, to pass through the interior of the liner 12 without corroding the liner 12.

Figure 1:
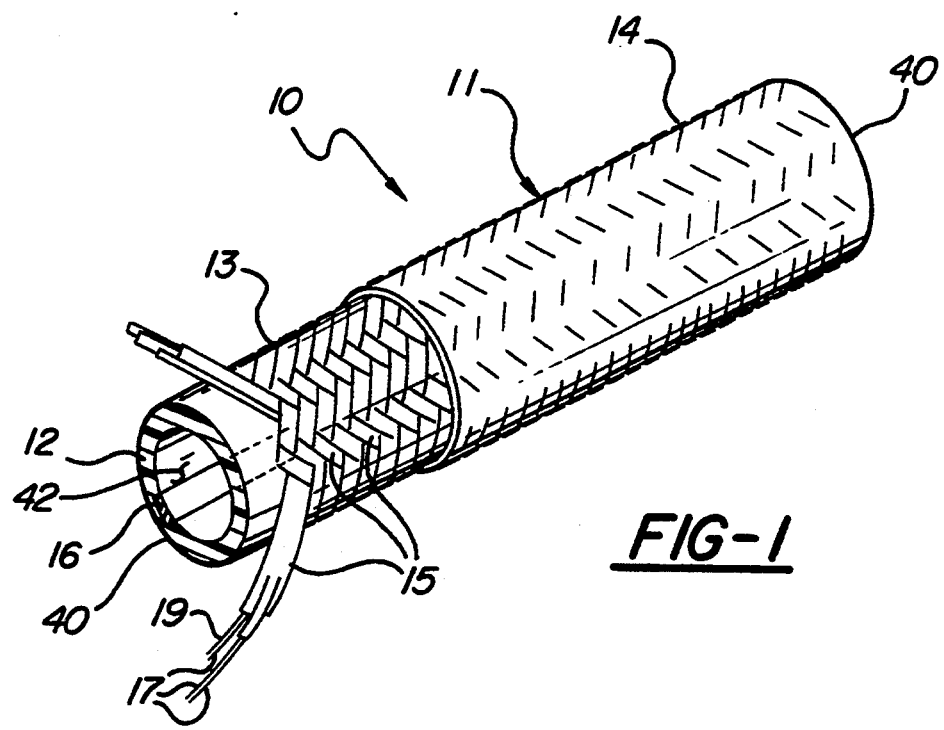
FIG. 1 is a perspective view of the preferred embodiment of the subject invention.

The assembly 10 further includes a braided or woven layer 13 about the exterior of the inner liner 12, as shown exposed in the left portion of FIG. 1. The braided layer 13 can comprise any non-metallic material disposed in interleaving fashion or wrapped tightly about the inner liner 12.

The assembly 10 is characterized by wear reducing means 19 for reducing the wear incurred by the braided layer 13 created between the braided layer 13 and any exterior structure located thereabout as fluids apply outwardly directed forces circumferentially against the inner diameter of the inner organic polymeric liner 12 in the form of high pressure impulses. The wear is accentuated because the fluid passes therethrough in impulse form to create a continuously varying amount of force which forces the braided layer 13 to move back and forth against the exterior structures with each impulse of fluid that passes therethrough.

The wear reducing means 19 is preferably a material used in the braided layer 13. In the preferred embodiment, the braided layer 13 includes a plurality of yarns 15 fabricated from a plurality of fibers 17 including glass fibers intermixed with material used to fabricate the wear reducing means 19 and, more particularly, aramid fibers 19. Glass 17 and aramid fibers 19 provide the necessary strength and resistance to frictional wear. Further, the glass and aramid 19 fibers are heat resistant which is important for use in heated environments and for making the assembly as will be described subsequently. The aramid fibers 19 allow the hose assembly 10 to be impervious to friction created between the hose assembly 10 and any exterior structure as well as being impervious to the wear which would be experienced by yarns including only glass fibers when such a hose assembly would be subjected to passing fluids under high pressures therethrough. More specifically, the aramid fibers 19, chosen specifically for their physical properties (discussed below), prevent or reduce wear on the hose assembly 10 due to the interplay between the hose assembly 10 and exterior surfaces located thereabout which occurs when high pressure impulses of fluid are passed therethrough.

The braided or woven fibers may be tightly wound or they may be loosely wound about the inner liner 12 having wide gaps between adjacent fibers. In the preferred embodiment, the yarns 15 are tightly woven such that the gaps or spaces between adjacent yarns 15 are minimal. The braided layer 13 adds to the strength of the inner liner 12. Particularly, by using a braided layer 13, the working pressure of the inner liner 12 is increased, allowing higher pressure fluids to flow through the inner liner 12. Further, the braided layer 13 adds to the tensile strength of the hose assembly When coupling members 20 are disposed on the ends of the tubular member 11, as will be described subsequently, the braided layer 13 increases the tensile strength of the hose assembly 10 sufficiently to fixedly connect any type of coupling member 20 to the tubular member 11. Finally, the braided layer 13 adds to the hoop strength of the inner liner 12.

The aramid fibers 19 are fabricated from aromatic polyamides which are formed by reactions that lead to the formation of amide linkages between aromatic rings. In practice, aromatic diamines and aromatic diacid chlorides are employed in an amide solvent. From these polymers, fibers of exceptional heat and flame resistance and high tensile strength and modulus are produced. Aramid is a manufactured fiber in which the fiber-forming substance is a long-chain synthetic polyamide in which at least 85% of the amide —(CC—NH)— linkages are attached directly to two aromatic rings. The aramids in commercial use have 100% of the amide linkages attached directly to two aromatic rings. Kevlar, a trademark of DuPont and the aramid fiber of the preferred embodiment, is based on PPD-T, poly(p-phenylene terephthalamide).

Aramid fibers are characterized by medium-to-ultrahigh tensile strength, medium-to-low elongation, and moderately high-to-ultrahigh modulus. The majority of these fibers have been reported to be either highly crystalline or crystallizable with densities for crystalline fibers ranging from 1.35 to 1.45 g/cm$^3$; hot drawn fibers have a density of 1.38 to 1.45 g/cm$^3$. Fibers from PPD-T, i.e., Kevlar ®, have a density of 1.45 g/cm$^3$.

The braided layer 13 includes, in the preferred embodiment, both the glass fibers and the aramid (or Kevlar ®) fibers. The hose assembly 10 may include a braided layer 13 consisting solely of aramid fibers 19 with no combination with glass fibers 17. A 100% aramid fiber 19 braided layer 13 is possible because of the emulsion or organic polymeric dispersion 14 (discussed subsequently) lubricates the individual fibers 19 preventing wear therebetween. In the preferred embodiment, however, the aramid fibers 19 would comprise between 10% and 20% of the total fibers used in the braided layer 13. The aramid fibers 19 may be either directly mixed in with the glass fibers or, in the alternative, a percentage of the bobbins used to fabricate the braided layer 13 may be exclusively aramid fibers 19. As an example of the latter, in a twenty four (24) bobbin braid manufacturing machine, two (2) to four (4) of the bobbins would be exclusively aramid fibers 19 whereas the remaining bobbins would have glass fibers.

Figure 4:
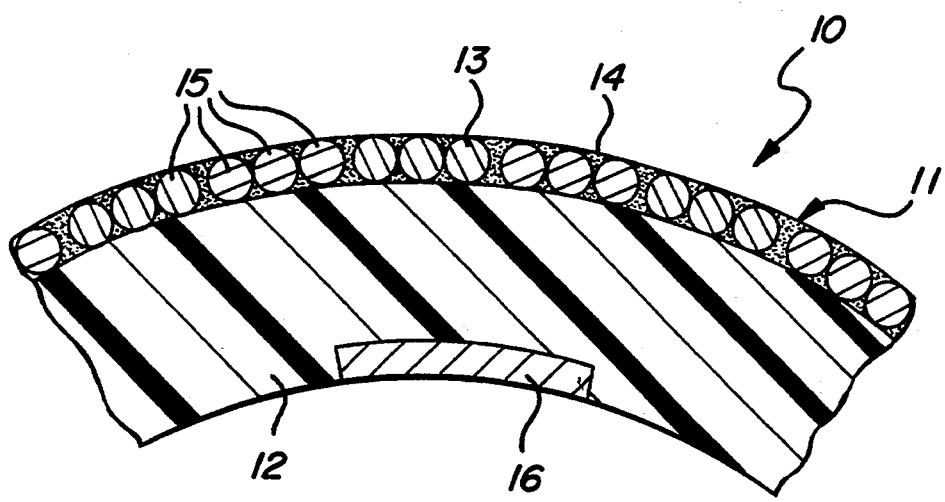
FIG. 4 is an enlarged sectional view of the hose assembly.

The assembly 10 further includes an organic polymeric dispersion or coating 14 in the braided layer 13. Specifically, an organic polymeric material is dispersed about the braided layer 13 and is located from the outer periphery of the braided layer 13 radially inwardly toward the inner layer 12 (as best viewed in FIG. 4). The organic polymeric material is deposited in the interstices of the braided layer 13. The coating 14 preferably comprises a fluorocarbon polymer.. Specifically, the coating 14 comprises a polymer of tetrafluoroethylene (PTFE), the polymer of fluorinated ethylene propylene (FEP), the polymer of perfluoroalkoxy resin (PFA), or the polymer ethylene-tetrafluoroethylene (ETFE).

The coating 14 covers or coats the yarns 15 of the braided layer 13, as shown on the right portion of FIG. 1. That is, the coating 14 covers the fibers of the braided layer 13 either from the outer periphery radially inwardly or from the inner organic polymeric liner 12 radially outwardly depending on the method used to apply the organic polymeric coating 14. The coating, therefore, does not extend radially outwardly from the outer periphery of the braided layer 13. After the material has been coated, yarn 15 is discernible. In effect, what results is a coating 14 having the braided layer therein.

The outer coating 14 is preferably formed by first braiding or wrapping the material 13 about the exterior of the inner liner 12. The organic polymeric material is then dispersed into the braided material 13 from the outer periphery of the braided layer 13 radially inwardly toward the inner liner. Preferably, the organic polymeric material is a fluorocarbon polymer in a dispersion. In other words, the coating 14, as applied, comprises a fluorocarbon polymer and at least one carrying fluid. The preferable fluid is water. It will be appreciated that any suitable fluid may be used. The fluorocarbon polymer dispersion coats or is dispersed throughout the entire braided layer 13. Specifically, the fluorocarbon polymer dispersion effectively coats each of the yarns 15 from the outer periphery radially inwardly. The yarn 15 is coated such that any gap between adjacent yarns 15 will be filled with the polymer dispersion by a widening action. Also, the outer periphery of each yarn 15 is completely coated. The carrying fluid is then removed from the dispersion by drying. This leaves a fluorocarbon polymer material dispersed throughout the braided layer 13 and therefore connects braided layer 13 to the inner liner 12 forming a single layer.

As previously stated, both the inner liner 12 and coating 14 are preferably fluorocarbon polymers. It is, however, not necessary that both inner liner 12 and the coating 14 be of the same fluorocarbon polymer, although they may be. For example, the inner liner 12 may be made of PFA while the coating 14 is made of PTFE. Any combination of the fluorocarbon polymers listed may be utilized for the inner liner 12 and coating 14.

The coating 14 in conjunction with the braided layer 13 allows the inner liner 12 to be bent without kinking. That is, the coating 14 is dispersed throughout the braided layer 13 provides strength to the inner liner 12 upon bending. This is commonly referred to as hoop strength. Thus, by using a polymeric coating 14 dispersed throughout the braided layer 13, a trim profile assembly is produced which results in a hood strength of the tubular member 11 being increased so that the tubular member 11 can be bent without kinking the inner liner 12. Further, the outer coating 14 adds to the working pressure of the hose. That is, the coating 14 provides strength and allows the inner liner 12 to accommodate a fluid under pressure. Also, the coating 14 hinders abrasion of the tubular member Said another way, the coating 14 aids in abrasion resistance of the tubular member 11. That is, because the coating is continuous about the outer periphery of the braided layer 13, the braided layer 13 is not subject to abrasion. The coating 14 resists abrasion.

The braided layer 13 is also lubricated by the coating 14. More specifically, the coating 14 penetrates much or all of the plurality of yarns 15 and surrounds much or all of the glass and aramid 19 fibers reducing the amount of friction produced therebetween. In the preferred embodiment, 50%-100% of the fibers 17, 19 are coated by the coating 14. The coating 14 coats the fibers and necessarily separates the fibers from each other reducing the friction created therebetween.

Because Kevlar ®, the preferred aramid fiber, is sensitive to ultra-violet radiation, the coating 14 is pigmented to reflect all ultra-violet radiation. In the preferred embodiment, the coating 14 is black.

Figure 3:
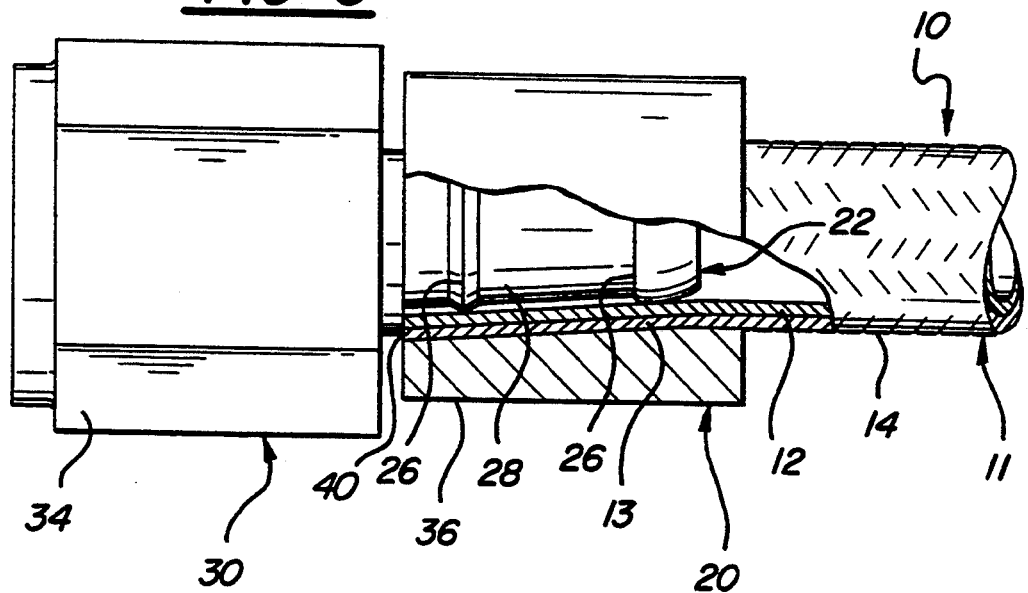
FIG. 3 is a side view partially broken away of the preferred embodiment of the subject invention including an alternative coupling member.

The assembly 10 may further include couplers, generally indicated at 20. The couplers 20 connect the assembly 10 to a fitting (not shown). The fitting is adapted to cooperate with the couplers 20. Specifically, the couplers 20 comprise a coupling assembly which includes an insert portion, generally indicated at 22 for inserting into and engaging the interior inner liner 12. The insert portion 22 may have a plurality of barbs 24 for engaging the interior of the inner liner 12 (as best viewed in FIG. 2). Alternatively, the insert portion may have a pair of annular ridges 26, and a smooth portion 28 therebetween (as best viewed in FIG. 3). The coupling assembly 20 further includes an engaging portion generally indicated at 30 extending longitudinally from the insert portion. The engaging portion is for engaging a fitting (not shown) adapted to cooperate therewith. The engaging portion 30 may comprise a male threaded member 32 (FIG. 2) or a female threaded member 34 (FIG. 3). The engaging portion 30 may also comprise any configuration adapted to cooperate with a member to which it is to be fixed. For example, the engaging portion 30 may comprise a socket to receive a mating ball joint. Finally, the coupling assembly 20 includes a locking collar 36. The locking collar 36 is disposed about the exterior of the outer coating 14 and is slid over the insert portion 22 of the coupling assembly 20. In this manner, the inner liner 12 is forced into tight frictional engagement with the insert portion 22 to prevent relative axial movement between the inner liner 12 and insert portion 22. The coupling assembly 20 can be of any other well-known type. For example, the coupling assembly 20 may be an organic polymeric material and may be molded out of the tubular member 11 for a mechanical connection or fusion bond.

As certain fluids flow through the inner liner 12, electrical charges may build throughout the length of the inner liner 12. In order to prevent these electrical charges from accumulating, the inner liner 12 has an electrical longitudinal conductive means coextensive with the length of the inner liner 12 for conducting electrical charge through the liner 12. In the instances where it is known that a charge will build due to the fluid flowing therethrough, the inner liner 12 has a conductive strip 16 of carbon black. The carbon strip 16 is electrically conductive and will dissipate any electrical charges built up by the fluid. 10 Alternatively, the whole inner tubular member 12 can comprise the conductive means. This is done by using carbon black as an entire inner liner 12. The braided layer 13 and coating 14 are preferably electrically non-conductive. This is important in that electrical charges applied to the exterior of the outer coating 14 will not be conducted throughout the length of the tubular member 11 or to the fluid passing through the interior of the inner liner 12. It will be appreciated that other conductive materials may be used to form the conductive strip 16.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

We claim:

1. A hose assembly (10) consisting of:
   an inner fluorocarbon polymeric tubular liner (12) having two ends (40) and a longitudinal hollow body (42) extending therebetween;
   an outer reinforcing layer (13) surrounding said inner fluorocarbon polymeric tubular liner (12), said outer reinforcing layer (13) including a plurality of yarns (15) fabricated from a plurality of fibers (17) tightly braided together and surrounding said inner fluorocarbon polymeric tubular liner (12) and an organic polymeric material (14) consisting essentially of a fluorocarbon polymer which is resistant to thermal and chemical degradation dispersed in said plurality of yarns (15) for lubrication and strengthening of said plurality of yarns (15) said hose assembly characterized by said plurality of yarns (15) including wear reducing means (19) for reducing wear on said hose assembly (10) from friction produced by each of said plurality of yarns (15) moving against surfaces exterior said outer reinforcing layer (13) due to impulses of fluids under high pressure passing through said hose assembly (10).

2. An assembly (10) as set forth in claim 1 further characterized by said wear reducing means (19) being fabricated from aramid fibers (19) intermixed into said plurality of yarns (15).

3. An assembly (10) as set forth in claim 2 further characterized by said aramid fibers (19) being fabricated from poly(p-phenylene terephthalamide).

4. An assembly (10) as set forth in claim 3 further characterized by said organic polymeric material (14) including the polymer of tetrafluoroethylene (PTFE) bonding to said inner fluorocarbon polymeric tubular liner (12) such that said polymer of tetrafluoroethylene (14) lubricates said plurality of yarns (15).

* * * * *